July 26, 1966   R. L. ABRAHAMS ETAL   3,263,228
AUTOMATIC FREQUENCY LOCK-ON CONTROL SYSTEM
Filed June 3, 1964   2 Sheets-Sheet 1

INVENTORS.
RICHARD L. ABRAHAMS
THEODORE HUBKA
BY
ATTORNEY.

FIG. 3

INVENTORS.
RICHARD L. ABRAHAMS
THEODORE HUBKA
BY *H. S. Mackey*
ATTORNEY.

United States Patent Office 3,263,228
Patented July 26, 1966

3,263,228
AUTOMATIC FREQUENCY LOCK-ON CONTROL SYSTEM
Richard L. Abrahams, Bronxville, and Theodore Hubka, Briarcliff Manor, N.Y., assignors to General Precision, Inc., a corporation of Delaware
Filed June 3, 1964, Ser. No. 372,240
12 Claims. (Cl. 343—17.7)

The present invention relates to the control of test equipment or apparatus, commonly referred to as ground support equipment for microwave radiant energy responsive apparatus, such as radar, for example, which transmit and/or receive pulsed, coherent microwave signals. The qualification of "pulsed, coherent" microwave signals is interpreted to mean that the instantaneous frequency of the carrier wave of each successive pulse, in a train of pulses, is substantially the same. In particular the present invention relates to the generation of a continuous output signal, herein referred to as a secondary signal, which is referenced, in phase and frequency, and positively locked-on to the carrier wave (CW) or carrier frequency of a pulsed, coherent microwave signal.

It is well known, in the field of radiant microwave technology, to reproduce or generate a continuous secondary signal at substantially the same phase and frequency as a continuous carrier wave by using the CW signal to drive a secondary oscillator and feed back the secondary signal (the output of the secondary oscillator) to the carrier wave input thereby synchronizing or locking-on the secondary signal to the CW driving signal, and generating a continuous secondary signal at substantially the same frequency as the continuous CW signal. However, when a microwave signal or CW signal of substantially high frequency is pulsed at a pulse rate other than the frequency of the CW signal, sideband frequencies, both above and below the CW frequency are developed around the CW signal.

Attempts to derive or generate a continuous secondary frequency at substantially the same frequency and phase as the pulsed CW frequency by driving a secondary oscillator by use of the pulsed CW signal, with feedback of the output of the secondary oscillator to the input of the pulsed CW signal, often results in the continuous secondary signal synchronizing with or locking-on to one of the sideband frequencies of the pulsed CW signal. This provides a continuous secondary signal which may be at a phase and frequency which is substantially the same as a sideband frequency of the CW frequency and the frequency of the secondary signal must then be determined before adjustment of the secondary oscillator may be made so as to provide the desired phase and frequency output signal of the secondary oscillator, that is, for example, generation of a continuous signal at substantially the same phase and frequency as the pulsed CW signal by the secondary oscillator.

Our invention provides a novel combination of mixing a pulsed, coherent CW signal with the secondary signal and providing at least two difference signals, each equally and oppositely offset in accordance with the difference in phase and frequency between the CW signal and the secondary signal and deriving therefrom an output signal representing and proportional to any offset in phase and/or frequency between the pulsed CW signal and the continuous secondary signal and employing the output signal to drive or adjust a secondary oscillator so as to provide a continuous secondary signal, which is in synchronism with or locked-on to the pulsed CW signal or is at a phase and frequency which is at a constant, predetermined differential from the pulsed CW signal.

Such output of a secondary oscillator at a frequency and phase which is in synchronism with or at a constant predetermined differential from the frequency of the CW signal may be used as a reference or control signal for driving test apparatus or ground support equipment to test the microwave radiant energy device from which the pulsed CW signal is derived.

Although the present invention shall be described relative to its use in conjunction with a Doppler, pulsed radar device, such as that taught in United States Patent 2,915,748 which may generate and transmit pulsed, coherent microwave radio frequency energy, the present description anticipates use of the present invention in conjunction with other types of microwave radiant energy generating, transmitting and/or receiving devices.

From one aspect the present invention provides a novel combination, which may generally be referred to as a positive phase lock automatic frequency control circuit, for providing a continuous secondary signal which is substantially the same in phase and frequency as the carrier wave phase and frequency of a pulsed, coherent microwave signal and locked-on to the carrier wave signal so that the phase and frequency of the secondary signal will substantially follow such CW signal, and thereby duplicate as a continuous signal, the carrier wave signal in phase and frequency in the event that the carrier wave frequency should drift, or otherwise vary in phase and/or frequency.

From another aspect the present invention provides a novel combination for providing a continuous secondary signal, the phase and frequency of which is at a substantially constant desired differential from the carrier wave phase and frequency of a pulsed, coherent microwave signal and locked-on to the carrier wave signal so that the phase and frequency of the secondary signal will be maintained at such constant differential from the phase and frequency of the carrier wave signal and thereby vary in phase and frequency directly as the carrier wave signal varies thereby maintaining a constant, desired differential between the phase and frequency of the pulsed, coherent carrier wave signal and the phase and frequency of the continuous secondary signal.

Other aspects or objects of the invention will be apparent from reading the following description with reference to the accompanying drawings in which:

FIG. 3 represents, in block form, one arrangement of the combination of the present invention for providing a continuous secondary signal which is positively locked-on to the pulsed, coherent carrier wave signal.

Figure 1:
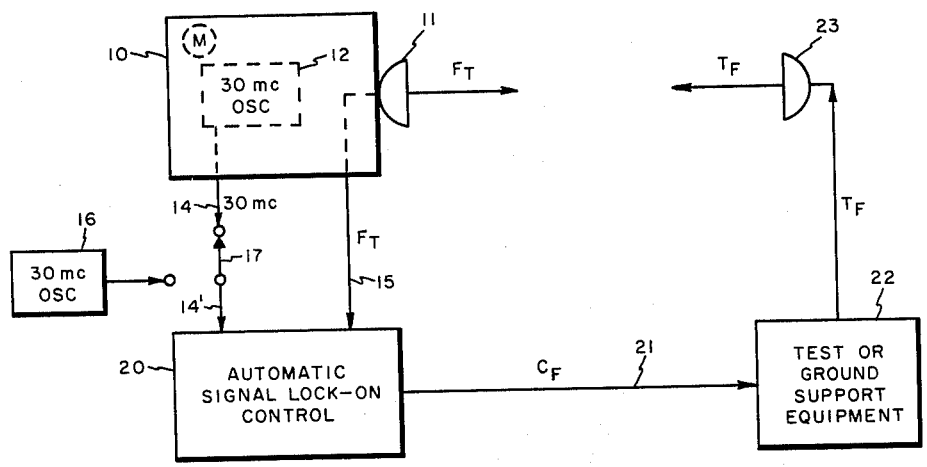
FIG. 1 represents, in block form, one application of the present invention in which the present invention is employed in combination with a microwave transmitting and receiving device and test apparatus therefor.

Referring to FIG. 1, one aspect of the invention is presented in which a microwave radiant energy transmitting and/or receiving device, represented in the form of a radar detector which transmits pulsed, coherent microwave radio frequency signals represents apparatus to be tested and from which a pulsed, coherent carrier wave signal is obtained. The block 10 represents such device and, in such block form, includes an antenna 11 which may serve to transmit and receive microwave energy. Some microwave transmitting and receiving devices may include two or more antennas, one for transmitting microwave radiant energy and another for receiving microwave radiant energy. Referring to block 10 as a radar detector but intending to include other forms of microwave radiant energy transmitting and/or receiving devices, some radar devices include an oscillator, such as a crystal oscillator represented by broken line box 12, 30 mc. OSC, for generating a basic or reference frequency signal of substantially constant frequency. This basic frequency may be multiplied, by means of frequency multiplier circuitry so as to provide a substantially higher frequency for transmitting, such as the frequency $F_T$, for example. This substantially higher frequency may be periodically interrupted or pulsed, at a desired rate. $F_T$ represents such signal.

It is assumed that the radar detector 10/11 is of the Doppler, pulse type radar detector, such as, for example, that type disclosed in the said United States Patent 2,915,748, and provides a signal $F_T$ which is a pulsed, coherent signal, the frequency of which is substantially higher than the basic frequency, here assumed to be 30 megacycles (mc.).

Figures 2A, 2B, 2C:
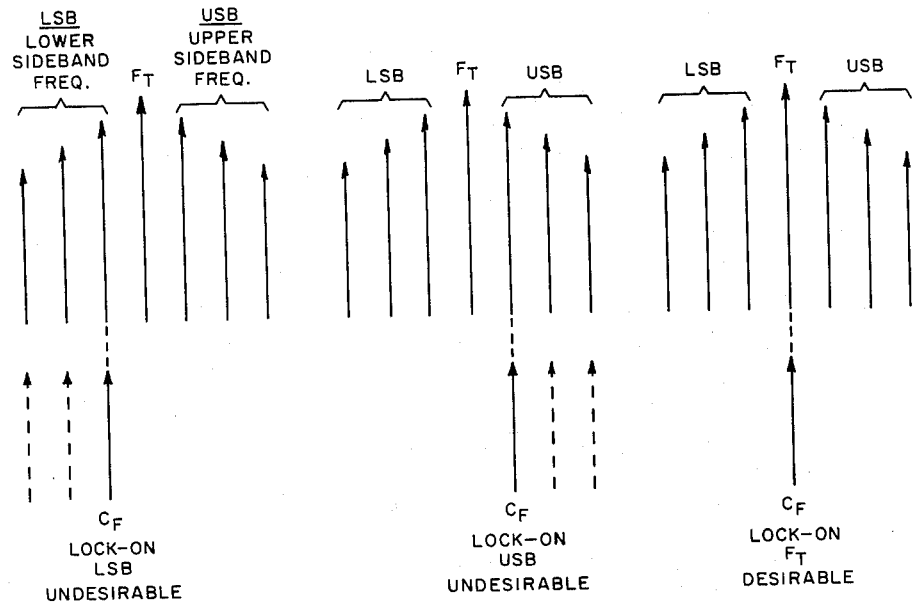
FIGS. 2a, 2b and 2c represent three separate forms of relationship between the carrier wave signal frequency and the sideband frequencies and the frequency of the secondary signal

The basic frequency signal, 30 mc., is represented as conducted to block 20 via lead 14, closed switch 17 and lead 14' while a portion of the transmitted signal $F_T$ is conducted to block 20 via lead 15. The signal 30 mc. is assumed to be substantially continuous while the signal $F_T$ on lead 15 is substantially the same as the radiated signal $F_T$ and is pulsed at a rate determined by the pulsing circuitry of the radar device. It is here assumed that the signal $F_T$ has sideband frequencies, such as represented in FIGS. 2a, 2b and 2c.

The radar device 10/11 may include an indicator, represented by a broken line circle M which may be a meter or receiving plate or tube on which information, in the form of received signals, is defined and presented or indicated.

Block 20, Automatic Signal Lock-On Control, as will be more fully described with reference to FIG. 3, receives the 30 mc. signal and the $F_T$ signal, including the sideband signals, as inputs and provides a continuous output signal $C_F$, which is synchronized with or locked-on to the signal $F_T$, at a phase and frequency which is substantially the same as the phase and frequency of signal $F_T$ or is at a phase and frequency which is at a predetermined differential from the phase and frequency of the signal $F_T$.

The output signal $C_F$ may be applied to test equipment such as represented by block 22, Test or Ground Support Equipment, via lead 21. The signal $C_F$ may serve as a control or reference signal for the test equipment 22 which may, in turn, provide another signal, referenced to $C_F$, and provide an output signal $T_F$ which may be applied to and transmitted by antenna 23, such signal serving as a simulated target or simulated reflected signal having predeterimned characteristics or value, and referenced to the signal $F_T$, which may be used to test the operation of the radar detector 10/11.

It should be understood that although solid links (14 and 15) are illustrated as serving to conduct the signals 30 mc. and $F_T$ respectively, the leads 14 and 15 represent a means of conducting such signals to block 20 and it is anticipated that other means may be used to so conduct such signals to block 20. It should also be understood that where it is not convenient to link the basic frequency signal, represented by 30 mc., to block 20 another stable frequency oscillator, such as a crystal oscillator or other stable frequency or constant frequency oscillator, for example, may be provided, to substantially duplicate the basic or reference frequency in the radar device 10/11 as an alternate arrangement. This is indicated by the block 16 and the switch 17 which switch may be positioned to provide a 30 mc. signal, for example, from block 16. By using an alternate basic frequency source, such as 16, for example, and an air link for conducting the signal $F_T$ and the sidebands thereof to block 20, the automatic signal lock-on control may be employed without physically connecting to the device to be tested.

Referring to FIGS. 2a, 2b and 2c, three signal lock-on arrangements are represented, two undesirable and one, FIG. 2c, desirable. In each of the figures a long arrow, in the center of a group of seven arrows, is labeled $F_T$ which represents the carrier wave frequency of the pulsed, coherent signal and the frequency on which lock-on is desired. The arrows on the left on each arrow $F_T$, labeled LSB, Lower Sideband Frequencies, represent the sidebands of lower frequency than the frequency of $F_T$ developed by the pulsing of the signal $F_T$, while the arrows on the right of arrow $F_T$, labeled USB, Upper Sideband Frequencies, represent the sidebands of higher frequency than the frequency of $F_T$, developed by the pulsing of the signal $F_T$.

FIG. 2c, in particular, represents the condition where a continuous secondary signal $C_F$ is of phase and frequency so as to lock-on to the transmitted signal $F_T$ which is a desirable condition. Employing our invention, as described herein, a continuous signal, represented by $C_F$ may be provided at a phase and frequency which is locked-on and is synchronized with a transmitted frequency $F_T$ thereby avoiding the conditions represented by FIG. 2a and FIG. 2b, where the signal $C_F$ is represented as locked-on to a lower sideband frequency and to an upper sideband frequency, respectively.

For convenience of describing our invention, exemplary frequency values will be employed although it is to be understood other comparative frequency values may be used, as desired.

Referring now to FIG. 3, a block diagram of one form of our new combination for providing a continuous secondary signal which is automatically synchronized or locked-on to the transmitted frequency of a pulsed, coherent microwave signal is presented.

In the upper left corner of FIG. 3 the radar detector device 10 is represented with conductor leads 14 and 15 represented for conducting the 30 mc. basic frequency signal and the transmitted signal $F_T$, and sidebands thereof, respectively. The 30 mc. signal serves as a common reference frequency and the use of a reference signal of common frequency is preferred, although not necessary.

Block 31, Heterodyne Mixer, receives the transmitted signal $F_T$ and its accompanying sidebands and the signal $C_F$ as inputs. The signal $C_F$ is a signal substantially equal in frequency to a prior transmitted signal, transmitted prior in time to the signal $F_T$, minus 49 megacycles, and is therefore labeled $F_T'$, minus 49 megacycles ($F_T'-49$ mc.) which is provided by the block 32, Local Oscillator. The signal $C_F$ is an output of the Automatic Signal Lock-On Control applied via lead 21 to the block 22 (see FIG. 1) and is also applied as feedback to the input of block 31.

The inputs $F_T$ and $C_F$ applied to block 31 are heterodyned and an output signal is provided which is substantially equal to the differential frequency (49 mc.), plus or minus the difference in phase between the present transmitted signal $F_T$ and the phase of $C_F$, signal $C_F$ being in phase with the prior in time transmitted signal $F_T'$, and pulsed at the pulse rate frequency (PRF) of the signal $F_T$. Thus the output of block 31 on lead 33 is represented as $49\pm\phi$ @ PRF. The $49\pm\phi$ signal on lead 33 is applied to block 34, 49 mc. IF AMP, representing an I.F. amplifier. The amplified signal $49\pm\phi$ mc. @ PRF is applied to two channels, here represented by the letters A and B respectively, for the various block components.

In order to oppositely differentiate the plus or minus phase difference of the $49\pm\phi$ mc. signal a 49 mc. oscillator, block 35, 49 mc. OSC, is provided which provides a substantially constant output signal at a constant frequency of 49 megacycles. The block 35 may be a crystal controlled or other stable frequency oscillator, for example.

The substantially continuous, constant 49 megacycle signal from block 35 is applied to block 36, Balanced Mixer. The basic frequency signal, 30 mc., is also applied via lead 14' to block 36 which mixes the two input signals and provides two outputs, represented by lead 37 and lead 38 via which a 79 mc. signal and a 19 mc. signal are respectively applied to Mixer A, block 40 and Mixer B, block 41. The Balanced Mixer, block 36, adds the inputs 49 mc. and 30 mc. so as to provide one output signal at 79 mc. and subtracts the 30 mc. input from the 49 mc. input to provide the other of the two output signals at 19 mc.

The signal $49 \pm \phi$ mc. @ PRF is applied to both Mixer A, 40, and Mixer B, 41. Mixer A subtracts the signal $49 \pm \phi$ mc. from the 79 mc. and provides an output signal, the frequency of which is substantially equal to the frequency of the basic signal, 30 mc., *minus* or *plus* the phase difference of the $49 \pm \phi$ mc. signal at the pulse rate frequency, i.e., $30 \mp \phi$ mc. @ PRF. Mixer B subtracts the 19 mc. signal from the $49 \pm \phi$ mc. signal and provides an output signal the frequency of which is substantially equal to the frequency of the basic signal, 30 mc., *plus* or *minus* the phase difference of the $49 \pm \phi$ mc. signal at the pulse rate frequency, i.e., $30 \pm \phi$ mc. @ PRF. The output signals of blocks 40 and 41 are represented as $30 \mp \phi$ @ PRF on lead 42 and as $30 \pm \phi$ @ PRF on lead 43 respectively.

Thus there has been provided two separate signals with a common base frequency each oppositely displaced in phase, which displacement is equal to the phase difference between a current transmitted signal $F_T$ and a prior transmitted signal $F_T'$. It will be appreciated that the phase difference may have resulted from drift of the $F_T$ signal.

The equally and oppositely phase displaced signals $30 \mp \phi$ mc. @ PRF and $30 \pm \phi$ mc. @ PRF are respectively applied via leads 42 and 43 respectively to a 30 mc. amplifier and detector as indicated by the respective blocks 44 and 45, each in its own channel. The 30 mc. basic frequency signal is also applied to blocks 44 and 45 via lead 14'. Amplifier-detector A, block 44, amplifies the input signals and, by means of a filter-detector circuit, filters out the 30 megacycle component of the $30 \mp \phi$ signal and provides an output at the pulse rate frequency, shifted in phase, equal to $(\mp \phi)$. Thus the output of block 44 is represented as PRF$\mp \phi$.

Amplifier-detector B, block 45, receives the 30 mc. signal from the basic frequency input lead 14' which signal first is passed through block 46, Phase Shifter, which shifts the phase of the basic 30 mc. frequency signal a predetermined amount. Amplifier-detector B amplifies its input signals and by means of a filter-detector circuit filters out the 30 megacycle component of the $30 \pm \phi$ signal and provides an output, at the pulse rate frequency, shifted in phase, equal to $(\pm \phi)$, in addition to the phase shift added by block 46. The output of block 45 is represented as PRF$\pm \phi$.

The respective signals (PRF$\mp \phi$) and (PRF$\pm \phi$) are applied to blocks 47 and 48, PRF Filter A and PRF Filter B respectively, by which the pulse rate frequency is further filtered so as to purify the PRF component of each signal. Both signals are individually amplified by their respective amplifiers, blocks 51 and 52, AMP. A and AMP. B, and applied to block 53, Phase Detector. The signal PRF$\mp \phi$ on lead 55 developed in channel A is employed as a reference signal and the difference in phase between the two signals, PRF$\mp \phi$ on lead 55 and PRF$\pm \phi$ on lead 56 is detected and appears as an output of block 53 on lead 54 in the form of a direct current (D.C.) voltage, which is proportional in value to the difference in phase or phase offset between the two input signals.

Since the signal developed in channel B has been shifted at least a minimum amount, as by passage of the 30 mc. signal through Phase Shifter 46, and the signal developed in channel A has not been so shifted, then the Phase Detector 53 may be so designed so as to provide an output representing zero difference in phase shift between the two signals on leads 55 and 56 in response to a phase difference substantially equal to such minimum phase shift value. Thus the output of the Phase Detector 53, on lead 54 may be substantially zero in response to a phase shift difference between the two signals substantially equal to the minimum phase shift value.

The control signal output of block 53 is applied to block 32 which output serves as a control signal for controlling the phase and frequency of the signal $C_F$ output, in accordance with the value of the control signal. Since the value of the control signal output of block 53 is proportional to the phase difference between the input signals to the phase detector, block 53, which phase difference is proportional to the phase difference between the signal $F_T$ and $C_F$ applied to block 31, then the value of the control signal output of block 53 is proportional to the phase difference between $F_T$ and $C_F$ as applied to block 31.

Thus the control signal output is used to control or vary the phase of the signal $C_F$ as desired, in accordance with the value of the control signal.

In our preferred arrangement, if the phase shift between the signals PRF$\mp \phi$ and PRF$\pm \phi$ is equal to the phase shift or phase offset provided by the Phase Shifter 46 then the output of the Phase Detector on lead 54 will be a predetermined value, such as zero, for example.

If a phase shift or offset in excess of the minimum shift or less than the minimum shift is detected then the value of the output on lead 54 will be proportional to such detected phase offset or difference, referenced from the predetermined value.

In accordance with our invention the phase of the signal $C_F$ is controlled or varied in accordance with the value of the control signal output on lead 54, as applied to the Local Oscillator 32. Thus our invention has provided a continuous signal $C_F$, the frequency of which is at a predetermined constant differential from the frequency of the signal $F_T$ and the phase of which is directly related to the phase of $F_T$, so as to lock-on to $F_T$.

The signal $C_F$ as shown is fed back to the block 31 as well as provided as an output via lead 21.

It may be desired to provide a continuous secondary signal which is in phase with the signal $F_T$ and of substantially identical frequency or a harmonic thereof. This may be accomplished by providing a local oscillator which may provide an output or secondary signal having the desired frequency characteristics and providing control of the phase of such signal by the control signal output on lead 54, as applied to the local oscillator, in the manner described above.

Since it is desired to introduce a predetermined frequency differential between the feedback signal to block 31, and the input as represented by $F_T$, the latter arrangement may include an additional signal mixer, which may be coupled to the 49 mc. oscillator block 35, for subtracting 49 megacycles from the output signal of the local oscillator 32. This reduced frequency signal would then be applied to block 31 as $F_T'-49$ mc., while the output of the local oscillator may be picked off at junction 58 so that the signal on lead 21 is substantially in phase with and substantially identical in frequency to the signal $F_T'$, or a harmonic thereof.

Thus we have shown how a continuous secondary signal may be provided which signal is positively locked-on to a signal $F_T$ which is a pulsed, coherent signal having associated therewith sideband frequencies, through the use of an automatic frequency lock-on control system having feedback of the output signal.

It will be appreciated that although the preferred form of our invention has been described and provides for a predetermined phase shifter (block 46) so as to provide at least a minimum phase shift of one signal over the other, the predetermined phase shifter may be eliminated. However, we have found that the providing of a predetermined phase shift between the two signals accords more positive detection of synchronization of the output signal of the local oscillator with the transmitted signal $F_T$.

It should be pointed out that the various components mentioned herein may be of the usual construction for the respective component, the values of the elements being determined by frequency values employed.

Although the preferred arrangement has been described, along with an alternate arrangement, and several alternate methods of coupling between the devices in a system using such invention have been suggested, other arrangements of the present invention, such as by rearrangement or interchange of the components may be made, as will be obvious to those skilled in the art, without departing from the spirit of invention as defined by the appended claims.

What is claimed is:

1. A control circuit for providing a continuous secondary signal which is automatically synchronized with a pulsed, coherent primary signal generated by a microwave signal generating device, in which said control circuit includes;

microwave signal mixing means for mixing said primary signal and said secondary signal and for providing a difference signal having frequency and phase shift characteristics directly proportional to the frequency and phase difference between said primary and secondary signals and pulsed at the pulse rate of said primary signal, means for coupling said primary signal to said mixing means, means for generating a fixed frequency signal substantially equal to the difference frequency between said primary and secondary signals, a source for providing a reference frequency signal, means for mixing said fixed frequency and said reference frequency signals and for providing a first signal substantially equal in frequency to the sum of said fixed frequency signal and said reference frequency signal and for providing a second signal substantially equal in frequency to the difference frequency between said fixed and reference frequency signals, means for mixing said first signal and said difference signal for providing a third signal, the frequency of which is substantially equal to said reference frequency, having phase shift characteristics directly proportional to the phase difference between said primary and said secondary signals and pulsed at said pulse rate of said primary signal, means for mixing said second signal and said difference signal for providing a fourth signal, the frequency of which is substantially equal to said reference frequency, having phase shift characteristics inversely proportional to the phase difference between said primary and said secondary signals and pulsed at said pulse rate of said primary signal, first filtering means for filtering the reference frequency component from said third signal for providing a first pulsed signal having phase shift characteristics directly proportional to said phase difference, second filtering means for filtering the reference frequency component from said fourth signal for providing a second pulsed signal having phase shift characteristics inversely proportional to said phase difference, means for effectively measuring the phase difference between said first pulsed signal and said second pulsed signal and for providing an output signal proportional to such phase difference, local generating means for generating said secondary signal, means coupling said output signal to said local generating means for varying the phase of said secondary signal in accordnace with the value of said output signal and, means for coupling said second signal to said microwave signal mixing means.

2. A control circuit as in claim 1 including phase shift means for shifting the phase of said second pulsed signal a predetermined amount and in which said means for effectively measuring the phase difference is adjusted so as to provide an output signal representing no phase shift differential between said first pulsed signal and said second pulsed signal when a phase shift difference of said predetermined amount is measured.

3. A control circuit as in claim 1 and in which said source for providing said reference frequency signal is the said microwave generating device and said control circuit further includes;

means for coupling said reference frequency signal to said means for mixing said fixed frequency and said reference frequency signals.

4. A control circuit as in claim 1 and in which said microwave signal generating device includes means for generating said reference frequency and said source of said control circuit includes;

coupling means for coupling said reference frequency to said means for mixing said fixed and reference frequency signals.

5. A remote, control circuit for providing a continuous microwave control signal which is automatically locked-on to the carrier signal of a pulsed, coherent microwave signal having sideband signals around the carrier signal generated by a microwave signal generating device in which said control circuit includes;

microwave signal mixing means for mixing said continuous microwave control signal and said pulsed coherent microwave signal and for providing a pulsed, difference signal having frequency and phase shift characteristics which are a function of the frequency and phase shift differential between the continuous microwave signal and said carrier signal and pulsed at the rate of said pulsed, coherent microwave signal, means for coupling said pulsed coherent microwave signal to said microwave signal mixing means, means for generating a continuous signal of fixed frequency, substantially equal to the frequency of said difference signal, means for generating a continuous reference signal of substantially constant frequency, a balanced mixer for receiving said fixed frequency signal and said reference signal and for providing a continuous first signal substantially equal in frequency to the sum of the frequencies of said fixed and reference signals and for providing a continuous second signal substantially equal, in frequency, to the difference frequency between the frequencies of said fixed and reference signals, means for mixing said first signal and said pulsed difference signal for providing a first pulsed signal substantially equal in frequency to said reference signal and having phase shift characteristics directly proportional to the phase difference between said control signal and said carrier signal said first pulsed signal being pulsed at said pulse rate of said microwave signal, means for mixing said second signal and said pulsed difference signal for providing a second pulsed signal substantially equal in frequency to said reference signal and having phase shift characteristics inversely proportional to the phase difference between said control signal and said carrier signal said second pulsed signal being pulsed at said pulse rate of said microwave signal, first filtering means for filtering the reference frequency component from said first pulsed signal, second filtering means for filtering the reference frequency component from said second pulsed signal, means for effectively measuring the phase shift differential between the filtered said first pulsed signal and the filtered said second pulsed signal and for providing an output signal proportional in value to said phase differential, means for generating said continuous microwave control signal, the last mentioned generating means including;

control means responsive to the value of said output signal for adjusting the phase of said continuous microwave control signal so as to be in phase with said carrier signal, and means for coupling said control signal to said microwave signal mixing means.

6. A remote, control-circuit as in claim 5 and further including output means coupled to said means for generating said continuous microwave control signal for providing said control signal as an output.

7. A remote, control-circuit as in claim 5 and in which the frequency of said continuous microwave control signal differs from the frequency of said carrier signal by a predetermined amount.

8. A remote, control-circuit as in claim 5 in which the frequency of said continuous microwave control signal is substantially equal to the frequency of said carrier signal and in which said control circuit further includes;

mixing means interposed between the output of said means for generating said control signal and the input to said microwave signal mixer and coupled for receiving said fixed frequency signal, and said control signal and for reducing the frequency of said control signal a number of cycles per second substantially equal to the frequency of said fixed frequency signal.

9. A control-circuit as in claim 5 and further including;

phase shift means for shifting the phase of said second pulsed signal a predetermined amount and in which said means for effectively measuring the phase shift differential is adjusted so as to provide an output signal representing no phase shift differential between said first and said second filtered pulsed signals when a phase shift differential of said predetermined amount is so measured.

10. A system for testing response of a microwave radiant energy responsive device including;

a microwave radiant energy responsive device for generating pulsed, coherent microwave radiant energy signals and including means for radiating said pulsed, coherent microwave energy signals and for receiving and responding to reflected radiated energy signals, from a remote source, test means for generating and radiating microwave radiant energy to simulate reflected radiated energy for testing response of said microwave radiant energy responsive device, a remote control-circuit for providing a continuous control signal of microwave energy synchronized with the carrier wave frequency of said pulsed, coherent radiated energy signals and locked-on to the carrier wave, said control-circuit including;

microwave energy mixing means for mixing said pulsed, coherent microwave radiated energy signals and said continuous control signal for providing a difference signal having frequency and phase shift characteristics proportional to the frequency and phase difference between said carrier wave and said control signal and pulsed at a rate of said pulsed, coherent radiated energy signals, means for generating a continuous fixed frequency signal, the frequency of which is substantially equal to the frequency of said difference signal, a source for providing a continuous reference frequency signal, balanced mixer means for receiving said fixed frequency signal and said reference frequency signal and for providing a first output signal the frequency of which is a function of the sum frequencies of said fixed frequency and said reference frequency signals and for providing a second output signal the frequency of which is a function of the difference frequency between said fixed frequency and said reference frequency, means for mixing said first output signal and said difference signal for providing a first pulsed signal the frequency of which is substantially equal to the frequency of said reference signal having phase shift characteristics directly proportional to the phase difference between said carrier wave and said control signal and pulsed at the rate of said microwave radiant energy, means for mixing said second output signal and said difference signal for providing a second pulsed signal, the frequency of which is substantially equal to said reference signal having phase shift characteristics inversely proportional to the phase difference between said carrier wave and said control signal and pulsed at the rate of said microwave radiant energy, first filtering means for filtering the reference frequency component from said first output signal for providing a first pulsed signal having phase shift characteristics directly proportional to said phase difference and pulsed at said pulse rate, second filtering means for filtering the reference frequency component from said second output signal for providing a second pulsed signal having phase shift characteristics inversely proportional to said phase difference and pulsed at said pulse rate, means for effectively measuring the phase shift difference between said first pulsed signal and said second pulsed signal and for providing an output signal proportional to such phase difference, means for generating said continuous control signal, means coupling the last mentioned output signal to the last mentioned generating means for controlling the phase of said continuous control signal in accordance with the value of said output so that the control signal will be in phase with said carrier wave, means coupling said continuous control signal to said microwave energy mixing means, and means coupling said control signal to said test means for controlling said test means so that said test means may be controlled by a continuous signal positively referenced to the carrier wave of the pulsed coherent microwave radiant energy signal generated by the said microwave radiant energy responsive device.

11. A system as in claim 10 and in which said remote control-circuit further includes;

phase shift means for shifting the phase of said second pulsed signal a predetermined amount, and said means for measuring includes means for providing an output signal representative of no phase shift difference between said first pulsed signal and said second pulsed signal in response to a phase shift difference equal to said predetermined amount.

12. A system as in claim 10 and in which said microwave radiant energy responsive means includes means for generating said continuous reference frequency signal and said control-circuit includes means for coupling said continuous reference frequency signal from said last mentioned means for generating so that said coupling means serves as said source.

References Cited by the Examiner
UNITED STATES PATENTS
3,088,109   4/1963   Meyer _____ 343—9 X CHESTER L. JUSTUS, *Primary Examiner.*

RODNEY D. BENNETT, *Examiner.*